United States Patent
Pletsch et al.

(10) Patent No.: US 12,197,953 B2
(45) Date of Patent: Jan. 14, 2025

(54) TECHNIQUES FOR DISTRIBUTED COMPUTING AND STORAGE

(71) Applicant: ASEARIS DATA SYSTEMS INC., Lehi, UT (US)

(72) Inventors: Erich Pletsch, San Jose, CA (US); Matt Morris, Lehi, UT (US)

(73) Assignee: ASEARIS DATA SYSTEMS, INC., Lehi, UT (US)

( * ) Notice: Subject to any disclaimer, the term of this patent is extended or adjusted under 35 U.S.C. 154(b) by 0 days.

(21) Appl. No.: 18/437,039

(22) Filed: Feb. 8, 2024

(65) Prior Publication Data
US 2024/0385883 A1 Nov. 21, 2024

Related U.S. Application Data

(60) Provisional application No. 63/502,847, filed on May 17, 2023.

(51) Int. Cl.
*G06F 9/50* (2006.01)
(52) U.S. Cl.
CPC .................. *G06F 9/5027* (2013.01)
(58) Field of Classification Search
CPC .................................................. G06F 9/5027
See application file for complete search history.

(56) References Cited

U.S. PATENT DOCUMENTS

| | | | |
|---|---|---|---|
| 10,824,474 B1 | 11/2020 | Kamboj | |
| 11,650,846 B2 | 5/2023 | Wu | |
| 2015/0317189 A1* | 11/2015 | Georgescu | G06F 9/50 718/104 |
| 2017/0031937 A1 | 2/2017 | Bowman | |
| 2021/0067423 A1 | 3/2021 | Newman | |
| 2021/0081256 A1 | 3/2021 | Sathyanaraya | |
| 2022/0164240 A1* | 5/2022 | Kim | G06F 9/5027 |
| 2023/0281046 A1* | 9/2023 | Golub | G07C 5/008 718/104 |
| 2023/0367640 A1* | 11/2023 | Chofleming, Jr. | G06F 9/5044 |

OTHER PUBLICATIONS

U.S. Appl. No. 18/437,065 Office Action mailed Apr. 23, 2024.
Yasar, Definintion Checksum, Dec. 2022, 5 pages. (Year:2022).

* cited by examiner

*Primary Examiner* — Charlie Sun
(74) *Attorney, Agent, or Firm* — Kunzler Bean & Adamson

(57) ABSTRACT

Apparatuses, systems, methods, and program products are disclosed for techniques for distributed computing and storage. An apparatus includes a processor and a memory that includes code that is executable to receive a request to perform a processing task, transmit at least a portion of the processing task to a plurality of user node devices, receive results of the at least a portion of the processing task from at least one of the plurality of user node devices, and transmit the received results.

29 Claims, 6 Drawing Sheets

TECHNIQUES FOR DISTRIBUTED COMPUTING AND STORAGE

CROSS-REFERENCE TO RELATED APPLICATIONS

This application claims the benefit of U.S. Provisional Patent Application No. 63/502,847 entitled "TECHNIQUES FOR DISTRIBUTED COMPUTING" and filed on May 17, 2023, for Erich Pletsch, et al., which is incorporated herein by reference.

FIELD

This invention relates to computing and more particularly relates to providing techniques for performing computing and storage functions in a distributed computing and storage system.

BACKGROUND

A distributed computer system consists of multiple software components that are on multiple computers but run as a single system. The computers that are in a distributed system can be physically close together and connected by a local network, or they can be geographically distant and connected by a wide area network. A distributed system can consist of any number of possible configurations, such as mainframes, personal computers, workstations, minicomputers, and so on. The goal of distributed computing is to make such a network work as a single computer.

BRIEF SUMMARY

Apparatuses, systems, methods, and program products are disclosed for techniques for distributed computing and storage. In one embodiment, an apparatus includes a processor and a memory that includes code that is executable to receive a request to perform a processing task, transmit at least a portion of the processing task to a plurality of user node devices, receive results of the at least a portion of the processing task from at least one of the plurality of user node devices, and transmit the received results.

In one embodiment, a system for distributed computing and storage includes an interconnect node, a plurality of user node devices communicatively coupled to the interconnect node, and an apparatus that includes a processor and a memory that includes code that is executable to receive a request to perform a processing task, transmit at least a portion of the processing task to a plurality of user node devices, receive results of the at least a portion of the processing task from at least one of the plurality of user node devices, and transmit the received results.

In one embodiment, a method for distributed computing and storage includes receiving a request to perform a processing task, transmitting at least a portion of the processing task to a plurality of user node devices, receiving results of the at least a portion of the processing task from at least one of the plurality of user node devices, and transmitting the received results.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

In general, the subject matter disclosed herein is directed to a distributed computing and storage environment or architecture that utilizes multiple end-user devices to perform various distributed computing and storage functions such as data storage, processing, analysis, and/or the like. The claimed solution may distribute at least portions of programs, applications, or other executable code among one or more end-user devices, which can then be used for distributed processing of the executable code. Similarly, the claimed solution may store data on one or more of the end-user devices for a distributed data storage solution. This disclosure describes various embodiments and solutions for providing techniques for distributed computing and storage.

Figure 1:
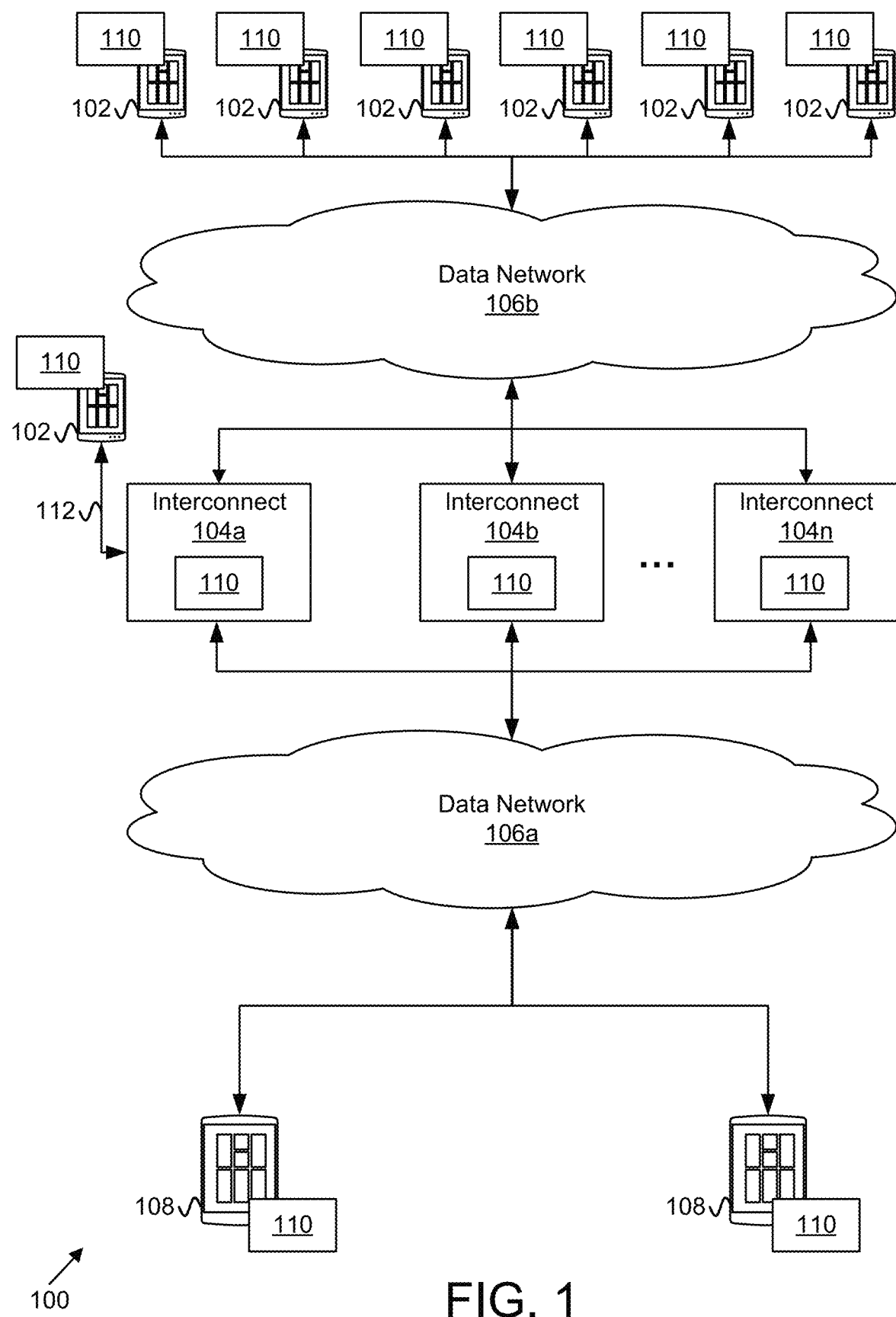
FIG. 1 illustrates one embodiment of a system for providing techniques for distributed computing and storage in accordance with the subject matter herein.

FIG. 1 depicts one embodiment of a system 100 for providing techniques for distributed computing and storage. In one embodiment, the system 100 includes a plurality of user node devices 102, interconnects 104*a-n* (collectively 104), data networks 106*a-b* (collectively 106), user client devices 108, and distribution management modules 110. In certain embodiments, even though a specific number of user node devices 102, interconnects 104, data networks 106, user client devices 108, and distribution management modules 110 are depicted in FIG. 1, one of skill in the art will recognize, in light of this disclosure, that any number of user node devices 102, interconnects 104, data networks 106, user client devices 108, and distribution management modules 110 may be included in the system 100. In one embodiment, an apparatus may include in instance of a distribution management module 110 and may be configured to perform the various functions of the distribution management module 110, described herein.

In one embodiment, the user node devices 102 and/or the user client devices 108 may be embodied as one or more of a server computer, desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like. The user node devices 102 may include end user devices such as smart phones and tablet computers that may have available resources, e.g., CPUs, GPUs, storage space, bandwidth, or the like, for performing processing and/or storage tasks.

In one embodiment, an interconnect 104 may be embodied as a network device such as a remote server, a cloud server, a device in a data center, a router, a bridge, a switch, and/or the like. However, an interconnect 104 may include various types of computing devices such as a server computer, desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

The system 100, in one embodiment, includes a first data network 106a that communicatively connects the user client devices 108 and the interconnects 104 and a second data network 106b that communicatively connects the interconnects 104 and the user node devices 102. In one embodiment, the first and second data networks 106a, 106b are different networks, e.g., networks managed or provided by different Internet Service Providers ("ISPs"). In certain embodiments, the first and second data networks 106a, 106b are the same data network 106.

The first and second data networks 106, in one embodiment, includes a digital communication network that transmits digital communications. The first and second data networks 106 may include a wireless network, such as a wireless cellular network, a local wireless network, such as a Wi-Fi network, a Bluetooth® network, a near-field communication ("NFC") network, an ad hoc network, and/or the like. The first and second data networks 106 may include a wide area network ("WAN"), a storage area network ("SAN"), a local area network ("LAN") (e.g., a home network), an optical fiber network, the internet, or other digital communication network. The data network 106 may include two or more networks. The first and second data networks 106 may include one or more servers, routers, switches, and/or other networking equipment. The first and second data networks 106 may also include one or more computer readable storage media, such as a hard disk drive, an optical drive, non-volatile memory, RAM, or the like.

In one embodiment, the first and/or second data networks 106 are embodied as a mesh network. As used herein, a mesh network is a local area network topology in which the infrastructure nodes (e.g., bridges, switches, and other infrastructure devices) connect directly, dynamically and non-hierarchically to as many other nodes as possible and cooperate with one another to efficiently route data to and from clients. This lack of dependency on one node allows for every node to participate in the relay of information.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In general, in one embodiment, the distribution management module 110 is configured to facilitate, coordinate, schedule, organize, manage, maintain, and/or the like the execution of computing and storage tasks, operations, functions, procedures, programs, applications, and/or the like among various user node devices 102 in a distributed computing and storage architecture. At least portions of the distribution management module 110 may be located on the user node devices 102, on the interconnects 104, on the user client devices 108, and/or elsewhere in the data networks 106. The functions of the distribution management module 110 on the various devices within the system 100 is described in more detail below.

In one embodiment, a user client device 108 accesses distributed computing and storage functionality provided at the user node devices 102 via one or more data networks 106, such as a public Internet, and an interconnect 104. For example, an end user of a user client device 108 may store their data on the distributed system of user node devices 102 via a distribution management module 110 executing on the user client device 108 and in communication with an interconnect 104 through the data network 106a. In such an embodiment, the distribution management module 110 may transmit the user's data to be stored from the user client device 108 to a distribution management module 110 executing on an interconnect 104, through a direct connection 112 (e.g., a serial connection, an ethernet connection, or the like) and/or via a data network 106b, which may then select one or more user node devices 102 to store the user's data. The interconnect 104, in one embodiment, proxies network connectivity between the data networks 106 (e.g., the Internet) and programs, applications, or the like that execute on the user node devices 102. In one embodiment, machine learning models may be trained and refined over time to select optimal user node devices 102 for performing the processing or storage tasks based on various factors including the usage activity/history of a user node device, the available resources of a user node device, and/or the like.

Similarly, in one embodiment, the distribution management module 110 on an interconnect 104 may expose one or more applications, programs, scripts, or other processing functions to an end user (e.g., through an application programming interface ("API"), command line interface ("CLI"), or graphical interface) via the user client device 108, which the user can select, program, or otherwise use to perform various computing tasks. As used herein, a computing task may refer to one or a set of functions, instructions, commands, scripts, or that like that are configured for performing distributed processing tasks, e.g., machine learning, mathematical processing, multimedia processing (e.g., image processing, video processing, audio processing, or the like), or the like; storage tasks such as distributed data storage; blockchain tasks; or the like, within the distributed computing system 100.

The distribution management module 110 on the user client device 108 may transmit the selected task, program, or function, and any associated data such as parameters, variables, and/or the like, to a distribution management module 110 on an interconnect 104, via the data network 106, which may then distribute the task, and any associated data, among user node devices 102 (e.g., to distribution management modules 110 executing on the user node devices 102) according to the type of task (e.g., a processing task (e.g., machine learning, multimedia processing, or the like), a data storage task, or the like), the capabilities of the user node devices 102, whether the user node has the selected functionality or programming to perform the task, and/or the like. The distribution management module 110 on the interconnect 104, in one embodiment, returns any results or data of processing the task to the distribution management module 110 on the user client device 108.

In one embodiment, the distribution management module 110 on the interconnect 104 provides an interface such as an API, CLI, or the like for deploying, managing, and monitoring programs, applications, functions, scripts, executable code, or the like executing on the interconnect 104 and on user node devices 102. In one embodiment, the distribution management module 110 enforces constraints around the functions that applications or programs that can be executed in the user node devices 102, e.g., computing functions, storage functions, data processing functions, or the like, that are programmed using functionality provided by the interface, e.g., functionality or libraries exposed via the API.

For instance, the distribution management module 110, via the API, may expose predetermined or preselected standard libraries that can be used to program a task for execution within the distributed system of user node devices 102. As used herein, a program may comprise executable code, instructions, functions, commands, or the like that are used to perform a processing or data storage task. Such standard libraries may include math libraries, input/output ("I/O") libraries, storage libraries, graphical processing libraries, multimedia libraries, and/or the like.

In one embodiment, the distribution management module 110 on an interconnect 104 determines which libraries, functions, hardware components, or the like, a program or task needs to execute and determines which, if any, of the user node devices 102 has the capabilities to execute the programmed task. For example, the distribution management module 110 may parse the executable code to determine which libraries, functions, inputs, outputs, and/or other parameters are needed to execute the program. Furthermore, the distribution management module 110 may determine which hardware is needed to execute the program/task, including CPUs, graphical processing units ("GPUs"), memory type and amount, storage type and amount, and/or the like (which may be determined based on the libraries, functions, inputs, outputs, and/or other parameters are needed to execute the program).

In another embodiment, the interconnect 104 may execute the program and distribute part or all the program execution to the user node devices 102 with the capabilities needed to execute the program.

Figure 2A:
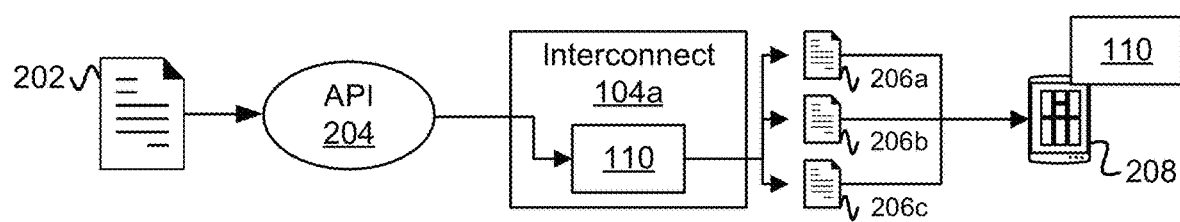
FIG. 2A illustrates one embodiment of task distribution for providing techniques for distributed computing and storage in accordance with the subject matter herein.
Figure 2B:
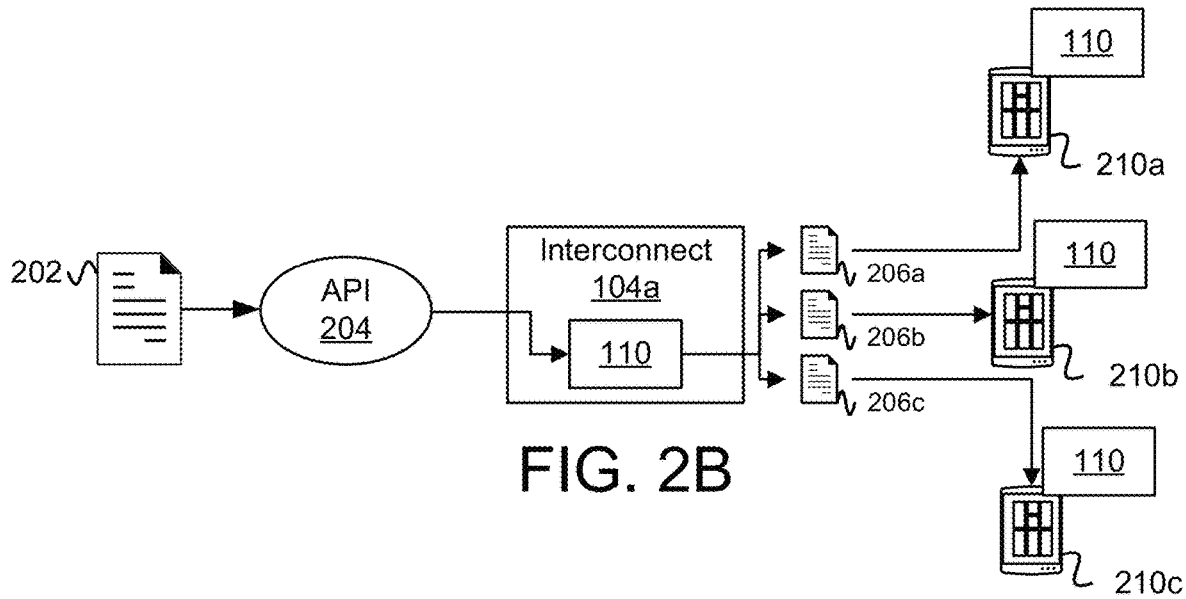
FIG. 2B illustrates one embodiment of task distribution for providing techniques for distributed computing and storage in accordance with the subject matter herein.

Referring to FIGS. 2A and 2B, which illustrate an example of distributing a program to one or more user node devices 102, a program 202 for a processing or storage task is developed and uploaded via an API 204 or other method of deploying software (e.g., a file transfer protocol, secure copy protocol, and/or the like) to a distribution management module 110 located on an interconnect 104a. The distribution management module 110 may process the program 202 to determine one or more parts, subcomponents, or portions 206a-c of the program 202, and may determine whether a user node device 208 has the capabilities necessary to execute the program 202. If so, then the distribution management module 110 sends the entire program to the user node device 208, via the distribution management module 110 on the user node device 208, to be executed on the user node device 208 when the program is used or selected by a user client device 108.

However, if the distribution management module 110 determines that there is not a single user node device 208 that has the capabilities to execute the program 202, the distribution management module 110 sends the different parts 206a-c of the program 202 to different user node devices 210a-c that are capable of executing the parts 206a-c of the program 202.

For example, in FIG. 2A, if a program 202 requires a GPU, compute libraries, storage libraries, and I/O libraries to execute, based on the determined parts 206 of the program 202, the distribution management module 110 on the interconnect 104a determines whether a user node device 208 has the capabilities necessary to execute the program 202, and if so, transmits the program 202 to the user node device 208. Otherwise, as shown in FIG. 2B, the distribution management module 110 distributes the different parts 206 of the program to the user node devices 210a-c that have capabilities to perform the different parts 206.

In such an embodiment, the distribution management module 110 on an interconnect 104a tracks or records which parts of the program 202 are located on which user node devices 102, e.g., generates and maintains a mapping of program 202 and program parts 206 to user node devices 102, how many copies of the program 202 are distributed, where the copies are distributed, a history of when a copy of the program 202 was accessed, and/or the like. In some embodiments, the distribution management module 110 on an interconnect 104a distributes the same parts 206 of the program 202 to multiple user node devices 102 for redundancy, e.g., to account for when a user node device 102 is offline or otherwise unavailable. In some embodiments, the distribution management module 110 on an interconnect 104a distributes the same parts 206 of the program 202 to multiple user node devices 102 for redundancy and performance, e.g., to account for when user node devices 102 are executing program parts at different speeds.

In one embodiment, when the distribution management module 110 receives a request to use or execute the program 202, for a processing or storage task, from a user client device 108, the distribution management module 110 determines one or more user node devices 102 where a copy of the program 202, or parts of the program 202, is stored, sends out the information for the request (e.g., data to be stored or processed), and returns the results to the user client device 108, e.g., results of a processing task, data resulting from a storage task (e.g., data being accessed), a flag indicating success or error of the task, or the like. In embodiments where parts 206 of the program 202 are spread out across different user node devices 102, the distribution management module 110 takes the results from the different user node devices 102, reassembles the results, and sends the reassembled results to the user client device 108, e.g., in a parallel processing manner. IN such an embodiment, the request may be received via an API, a graphical user interface (GUI), a CLI, and/or the like.

An obstacle in parallel processing (e.g., a mode of computer operation in which a process is split into parts that execute simultaneously on different processors) is that different devices have different processor speeds, memory capacities, numbers of processing cores, and/or other characteristics/specifications. This makes using them to perform parallel data processing difficult as most parallel processing methodologies expect parallel devices to be identical in performance characteristics, e.g., for timing reasons.

As such, in certain embodiments, the distribution management module 110 performs asynchronous multithreading to perform non-blocking parallel execution, storing results received out of order and reassembling them in order, as needed, and returning the reassembled results to the user client device 108. For example, different parts of a data structure may be received out of order and reassembled in order prior to returning the data structure to the requesting user client device 108.

In certain embodiments, the distribution management module 110 sends the same program or task to multiple user node devices 102 for processing and returns or stores the result that is received from the first user node device 102. In other words, the distribution management module 110 creates a race condition where the first user node device 102 that completes the task wins. In such an embodiment, the distribution management module 110 aborts or cancels the tasks on the other user device nodes 102 after the result is received from the first user node device 102, or discards results that are received subsequent to the first result.

In such an embodiment, the distribution management module 110 builds redundancy into the processing in the event one of the user node devices 102 goes offline or otherwise becomes unavailable during execution of the task/job. In this manner, the distribution management module 110 ensures the fastest processing of the task in the event one or more of the user node devices 102 is operating more slowly than others during execution of the task/job.

In such an embodiment, if one or more expected results are not received from the user node devices 102 performing tasks, the distribution management module 110 performs a cleanup process that checks whether a complete set of expected results are received for the task. In one embodiment, if the distribution management module 110 determines that one or more expected results are missing, the distribution management module 110 (re)sends the tasks associated with the missing expected results to n+1 nodes for processing (for redundancy).

In one embodiment, the distribution management module 110 sends each program or task to a single user node device 102 for processing and receives the results. In certain embodiments, if the single user node device 102 goes offline while executing a task, if the single user node device 102 does not respond with results within a predefined timeout period, or if one or more expected results are missing, the distribution management module 110 sends the task to a different user node device 102 for execution completion. In such an embodiment, the distribution management module 110 performs the cleanup process, described above, to ensure that a complete set of the results is received for the task. If so, the results are reassembled out of order, as described above. Otherwise, the distribution management module 110 sends the tasks associated with the missing expected results are sent to another user node device 102 for completion.

In certain embodiments, the program or task may be broken down into multiple different parts, subcomponents, or portions and distributed among tens, hundreds, or even thousands of user node devices 102. In one embodiment, the distribution management module 110 maintains a blockchain or other distributed transactional ledger to track how the parts of a program or task are distributed, which user node device 102 responded first, and how the results are reassembled for return to the requesting user client device 108.

Referring again to FIG. 1, in one embodiment, the distribution management module 110 scales the number of user node devices 102 that are used for processing based on a number of requests for load management, e.g., adding or removing user node devices 102 as needed. Accordingly, the number of user node devices 102 that are needed at any time may be referred to as the entropy number, which is the number of user node devices 102 that are needed to perform the task plus a minimum of n additional user node devices 102, e.g., one user node device 102 plus two (n) additional user node devices 102. In such an embodiment, when the distribution management module 110 receives a request for processing, the request is sent to at least 1+n different user node devices 102 for redundancy, e.g., three different user node devices 102.

In one embodiment, the distribution management module 110 executes on user node devices 102 that are not under the direct control of the distribution management module 110 or another device/component of the system 100. A problem with not having control of the user node devices 102 is that the user node devices 102 may go offline, down, or otherwise become unavailable at any time without any warning, notification, alert, or the like. Further, in the case of mobile devices, operating systems may restrict, limit, or otherwise prevent access to certain features or functions of the device.

Devices, for instance, may prevent remote code execution. To solve for this restriction, in one embodiment, the distribution management module 110 precompiles or preassembles modules, objects, libraries, or other code bodies (e.g., at the interconnect 104) for execution on the user node devices 102 within compliance with security or other policies of the operating systems executing on the user node devices 102. In certain embodiments, the distribution management module 110 may transmit the precompiled modules to the user node devices 102 for execution. In certain embodiments, precompiled modules are included with the distribution management module 110 code installed on the user node devices 102.

In such an embodiment, the distribution management module 110 exposes various features, functions, and/or the like of the user node devices 102, e.g., via an interface such as an API, CLI, or the like to an interconnect 104 to establish a connection between the user node devices 102 and the interconnects 104, or more particularly, between a distribution management module 110 executing on the user node devices 102 and a distribution management module 110 executing on the interconnect 104, e.g., via a socket.

In one embodiment, the distribution management module 110 executes arbitrary code at the interconnect 104. As used herein, arbitrary code execution may refer to the ability to run any kind of code, instructions, commands, or the like, on a device. Here, the arbitrary code execution at the interconnect 104 may refer to code that is used to perform pre- and post-processing associated with the request, code for sending the request and receiving the results, and/or the like, which has been developed using a software development kit ("SDK") designed for the distributed system 100. For example, the distribution management module 110 may receive a request at an interconnect 104 from a user client device 108 for converting a video from a .mp4 format to a .mkv format. In such an embodiment, the distribution management module 110 at the interconnect 104 receives the video, executes arbitrary code to determine a user node device 102 that has a video codec for processing the video where the video codec is an allowed or unrestricted codec for a particular user node device 102, sends the video to the particular user node device 102 via an API, and receives the results for returning to the user client device 108.

In another embodiment, the distribution management module 110 executes arbitrary code at the interconnect 104. In such an embodiment, the code may have been developed using an SDK, runtime environment, or compiled code not specifically designed for the distributed system 100 but which is supported by the distributed system 100. For example, the distribution management module 110 may receive a request to deploy a software program 202 written for the Java Runtime Environment ("JRE') at an interconnect 104 from a user client device 108 for processing a data set. In such an embodiment, the distribution management module 110 at the interconnect 104 receives the program, deploys it within a JRE, and then executes the code. The interconnect 104 while executing the code within the JRE, determines one or more user node devices 102 that have capabilities to offload part or all of the execution of the program to the particular user node device, sends those parts of the software execution to the particular user node devices 102 via an API, and receives the results for returning to the user client device 108 through the interconnect 104.

In one embodiment, the interconnectivity between the user node device 102 and the interconnect comprises at least two I/O streaming channels, one for sending/receiving data and one for command/control of the streaming channel. In one embodiment, the distribution management module 110 partitions, divides, or otherwise breaks down the data into smaller chunks to be streamed to the user node device 102 over the streaming channel. Moreover, in certain embodiments, the distribution management module 110 encrypts the data while it is at rest at the interconnect 104, while it is at rest on the user node device 102, and while it is in transit to the user node device 102 (e.g., via secure socket layer ("SSL")).

In certain embodiments, a queue is used to facilitate task management and processing between an interconnect 104 and a user node device 102. For instance, at the interconnect 104, the distribution management module 110 adds tasks or jobs to a queue and the distribution management module 110 on a user node device 102 requests the next task or job in the queue from the interconnect 104. Such a task queue provides an asynchronous technique for distributing tasks/jobs for execution on user node devices 102.

In one embodiment, the distribution management module 110 on a user node device 102 may execute arbitrary code within a runtime environment, e.g., a JRE, a browser, and/or the like. For example, the arbitrary code may be written in JavaScript and run in a headless browser (e.g., a browser without a graphical interface). In one embodiment, the distribution management module 110 may package and deploy a runtime environment on the user node device 102 for execution of arbitrary code on the user node device 102.

In further embodiments, the distribution management module 110 on a user node device 102 may execute arbitrary code within a virtual container environment. As used herein, a virtual container may refer to an operating system virtual environment that packages together everything needed to run a single application, along with runtime libraries they need to run. The container may include the code, its dependencies, and even the operating system itself. In such an embodiment, the distribution management module 110 on an interconnect may deploy containers on user node devices 102 for arbitrary code execution within the container environment.

One limitation to a container environment, however, is trying to make a service available from the container on the user node device 102 over a network to the Internet or other network outside of the user node device 102. To get around this limitation, in one embodiment, the distribution management module 110 creates a local socket connection to the container and then pipes that connection to the interconnect 104, essentially creating a direct connection between the interconnect 104 and the container running on the user node device 102.

In another embodiment, to overcome the aforementioned limitation to using a container environment, the distribution management module 110 may double wrap a container, e.g., execute a container within a container. In such an embodiment, the outer container acts as a proxy that connects to the distribution management module 110 on the interconnect 104 and facilitates a connection between the inner container and the distribution management module 110 on the interconnect 104.

Regarding data security and data storage tasks, in one embodiment, because the distribution management module 110 does not have complete physical or logical control of a user node device 102, e.g., does not have full permissions, root permissions, super user permissions, or the like, data that is stored on the user node device 102 may be accessible to other applications or users of the user node device 102.

In one embodiment, to ensure that the data is secured on the user node device 102, the distribution management module 110 on the user client device 108 may encrypt the data prior to transmitting the data to the interconnect and/or encrypt the data on the interconnect prior to transmitting and storing the data to the user node device 102. For example, as data is received from the user client device 108 as part of the request for distributed computing and storage in the system 100 or generated on the interconnect 104 as part of pre-processing for the request, the distribution management module 110 encrypts the data. In certain embodiments, the distribution management module 110 encrypts the data using a predefined private key (e.g., as part of a symmetric encryption scheme, or as one part of an asymmetric encryption scheme).

In further embodiments, the distribution management module 110 on the interconnect takes the encrypted or unencrypted data and divides, partitions, fragments, shards, or otherwise breaks the encrypted data down into multiple smaller data chunks and stores the data chunks across multiple different user node devices 102, e.g., three different user node devices 102. In such an embodiment, the distribution management module 110, prior to fragmenting the data into smaller data chunks, creates and/or records a checksum (or other identifier) for the data, so that the data can be verified when the smaller data chunks are reassembled. Furthermore, the distribution management module 110, in one embodiment, creates and/or records a checksum of each of the smaller data chunks prior to storing the data chunks on the user node devices 102. In one embodiment, the distribution management module 110 stores each data chunk on at least three different user node devices 102, for redundancy. In some embodiments, data chunks from the same data may be stored on the same user node devices 102 or different user node devices 102.

In one embodiment, the distribution management module 110 generates and maintains a map, table, or other listing of the data chunks to the user node devices 102 that they are stored on, which is used for reassembly of the data, and stores the map along with the private key separate from where the data chunks are stored, e.g., on the interconnect 104. For reassembly of the data, the distribution management module 110 references the map to locate the data chunks, retrieves the data chunks for the user node devices 102, and performs a checksum of the data chunks to compare against and verify the original checksum that was taken prior to storing the data chunks. The distribution management module 110 reassembles the data chunks and uses the private key to decrypt the reassembled data.

In various embodiments, the distribution management module 110 checks whether an encrypted data chunk already exists in the system 100 (e.g., is already being stored on a user node device 102) and, if so, creates an additional pointer or copy of the data chunk instead of creating multiple copies of the same data chunk, essentially deduplicating the data by utilizing a data chunk that is already stored in the system 100. In other words, if a new data chunk being added to the system 100 is identical to an existing data chunk in the system 100, instead of adding multiple new copies of the data chunk, the distribution management module 110 creates one new copy and increases the minimum number of user node devices 102 for the data chunk to three plus the number of duplicate copies (e.g., four, five, six, etc., depending on how many data maps make use of this data chunk).

In one embodiment, when a user node device 102 goes offline or otherwise becomes unavailable, the data stored on that user node device 102 also becomes unavailable. Accordingly, the distribution management module 110, in one embodiment, marks, flags, or otherwise indicates the data chunks on the user node device 102 for grooming. In such an embodiment, the distribution management module 110 determines whether the minimum (e.g., three user node devices 102) amount of entropy is currently available online, and if not, the distribution management module 110 may clone and/or create a duplicate copy of the flagged data chunks (for storage on a different user node device 102) to fill the void that was created by unavailable user node device 102.

In further embodiments, when a user node device 102 comes online or otherwise becomes available, the distribution management module 110, prior to the user node device 102 reconnecting to the system 100, performs a health check of the data chunks stored on the user node device 102. If the distribution management module 110 verifies that the data chunks are valid, the distribution management module 110 updates the map (e.g., updates the pointers in the map to point to the data chunks on the user node device 102 reconnecting to the system 100). Moreover, in one embodiment, the distribution management module 110 checks the entropy to ensure that the minimum amount of entropy in the system 100 exists. If so, the distribution management module 110 identifies the user node device 102 with the lowest performance (e.g., highest latency, slow response times, low reliability, or the like), and marks or flags the data chunks stored on that user node device 102 for deletion or overwrite. In certain embodiments, until the distribution management module 110 marks the data chunks as deleted, the data chunks will continue to exist as an additional copy of the data chunks until actually overwritten.

Regarding data caching, when the distribution management module 110 receives a request to retrieve data stored on the user node devices 102, the distribution management module 110 checks the map and retrieves the data chunks for the user node devices 102. The distribution management module 110 may reassemble the data chunks, verify the reassembled data using a checksum (e.g., comparing the checksum of the reassembled data to a checksum of the data prior to fragmenting the data into chunks), and returns the reassembled data to the requesting user client device 108. In such an embodiment, the distribution management module 110 stores a copy of the reassembled data in a cache on the interconnect for a period of time in the event that the data is requested again within the period of time.

In one embodiment, if the data chunks associated with the data in the cache changes, the distribution management module 110 retrieves the data chunks again, reassembles the data, verifies the reassembled data, and stores the reassembled data in the cache and prunes or removes the old copy of the reassembled data in the cache from the cache. In various embodiments, the distribution management module 110 utilizes artificial intelligence or a machine learning model that is trained to optimize the time that the reassembled data is stored in the cache, especially with a limited amount of available cache available on the interconnect 104. For instance, artificial intelligence or machine learning model may be trained or may learn (e.g., using on historical data access data) and used to examine or analyze patterns of access to data across the system 100 to prioritize data that is being accessed more often than others to preserve the frequently accessed data in the cache.

In various embodiments, the distribution management module 110 further utilizes artificial intelligence or machine learning to optimize the specific interconnects 104 where data is made available via cache, and to preposition data to optimize response time for end user devices 108. For instance, artificial intelligence may be used to examine or analyze patterns of access to data across various geographic locations or performance of networks connecting user client devices 108 to interconnects 104.

In one embodiment, the distribution management module 110 on the user client device 108 selects or determines an optimal or best fit interconnect 104 to communicate with based on one or more factors such as the geographic location or proximity of the interconnect 104 relative to the user client device 108, distance (e.g., network distance) between the user client device 108 and the interconnect 104 and/or the user node devices 102, historical selection of the interconnect 104, availability of the interconnect 104, the number of user node device 102 connected to the interconnect 104, the capabilities of the user node devices 102 connected to the interconnect 104, and/or the like. Machine learning models may be trained and refined over time to select an optimal interconnect 104 based on the various factors described above.

In various embodiments, the distribution management module 110 on the interconnect 104 where the user node device 102 is currently connected may request that the specific user node device 102 switch interconnects 104 and communicate with a different interconnect 104 within the system 100.

In one embodiment, the user node devices 102 have different capabilities, e.g., different hardware and software capabilities, different amounts of available memory and storage, different bandwidth availability, different restrictions on their operating systems, and/or the like. For instance, different smart phones have different hardware and software configurations and specifications. In such an embodiment, the distribution management module 110 tracks the individual capabilities and/or specifications of the user node devices 102, e.g., as a list or table, and matches requests or jobs to user node devices 102 that are a best fit for executing the job. In such an embodiment, the distribution management module 110 utilizes ratification intelligence or machine learning to determine the best fit based on the capabilities of the user node devices 102 and the requirements of the requested job.

In various embodiments, the distribution management module 110 is connected to or in communication with a primary interconnect, a secondary interconnect, a tertiary interconnect, and/or the like for redundancy, e.g., in the event a primary interconnect becomes unavailable or a user client device 108 connected to the primary interconnect that is performing a processing or data storage task becomes unavailable during the task, a secondary interconnect may be selected to continue processing the task. In certain embodiments, the secondary interconnect, tertiary interconnect, and so on are located on different communication networks, e.g., networks offered by different Internet service providers (e.g., AT&T, Comcast, Verizon, or the like).

Furthermore, the distribution management module 110 on the interconnect 104 may manage, monitor, track, and/or the like the user node devices 102 (e.g., tracking which applications or programs are executing or executable on each user node device 102, which user node devices are online or offline, and/or the like). In such an embodiment, the distribution management module 110 may use artificial intelligence or machine learning to determine patterns of the availability of the user node devices 102 to be able to predict, estimate, or forecast when the user node devices 102 will be online or offline and make decisions regarding how and when to use the user node devices 102.

In one embodiment, because Internet connectivity is inherently unstable such that outages and network issues can impact performance of services that rely on devices connected via the Internet, the distribution management module 110 may measure network performance indicators such as latency, packet loss, and jitter for a user node device 102. The distribution management module 110 may also measure device performance indicators such as response time, completion time, capacity, availability for a user node device 102. The distribution management module 110 may further use various performance indicators to assign a health score to the user node device 102. The distribution management module 110 may use the health score to determine which user node devices 102 to use, at which times, and for which tasks.

In one embodiment, the user node devices 102 may be connected to a network, e.g., the Internet, from behind a firewall. Thus, the distribution management module 110 on the interconnect 104 may not be able to directly connect to the user node devices 102 if the firewall is configured to block incoming and outgoing connections to the interconnect 104. In one embodiment, the distribution management module 110 creates a persistent socket connection between the user node device 102 and the interconnect 104 when the user node device 102 comes online. In such an embodiment, the interconnect acts as a gateway to the Internet for the user node device 102. In such an embodiment, the interconnect 104 also acts as a proxy between user client device 108 and the user node device 102. In such an embodiment the user node device 102 could for example publish content or web services to the Internet via micro services running on the user node device 102.

In further embodiments, the user node devices 102 may communicate directly with one another in a peer-to-peer and/or mesh type network architecture. In such an embodiment, the system 100 may not include interconnects and the interconnect functionality of the distribution management module 110 may be located on the user node devices 102. Alternatively, in certain embodiments the interconnects 104 may participate in the peer-to-peer mesh such that the system 100 includes user node devices 102 and interconnects 104 connected to each other in a mesh type of network architecture.

In one embodiment, a distribution management module 110 executing on a user node device 102 runs a client application on the user client device 108, which may include a mobile application, a service, a graphical user interface, and/or other program, or some combination thereof. In one embodiment, the distribution management module 110 runs a client application as a background process. In such an embodiment, the client application is configured to automatically wake up or activate in the background to execute compute tasks when certain conditions are met, e.g., when the user node device 102 is not in use by an end user, when the user node device 102 is in a condition to run these tasks (e.g., is not performing other resource-intensive tasks) without negatively impacting the performance or battery life of the user node device 102, when the user node device 102 is connected to a particular type of network (e.g., a Wi-Fi network versus a cellular network), and/or the like.

In one embodiment, the distribution management module 110 allows an end user to set different parameters, settings, conditions, limits, or the like, via the client application, associated with the automatic wake up or activation of the background process. For instance, the distribution management module 110 may provide a GUI with graphical interface controls (within the client application), an API, a CLI, or the like for the user to interact with to set different parameters.

Figure 3:
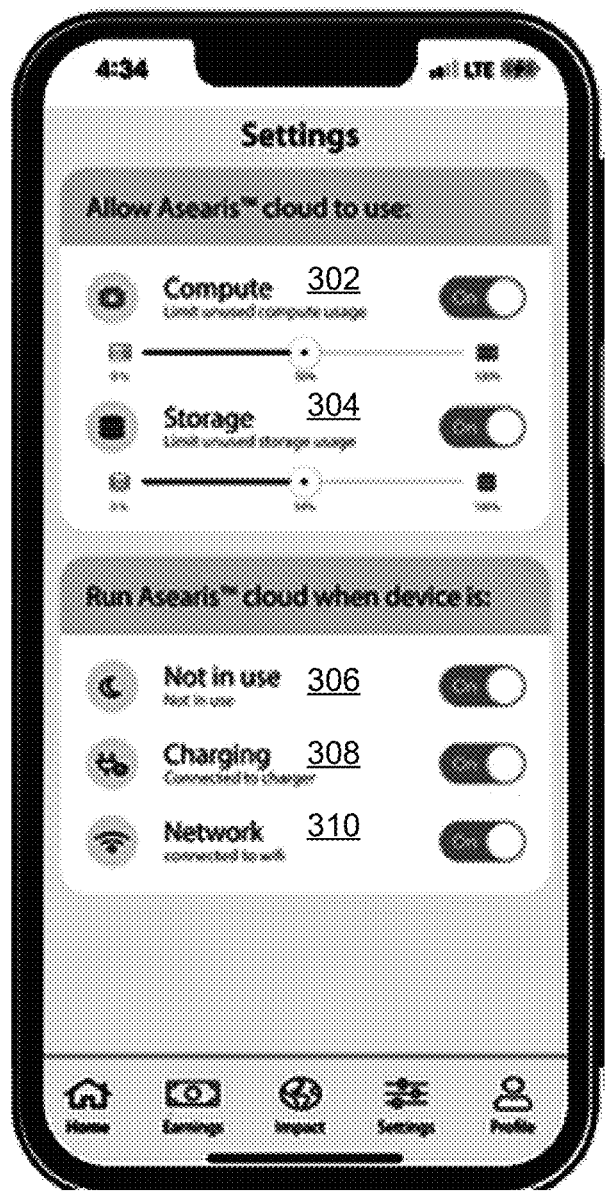
FIG. 3 illustrates an example embodiment of a graphical user interface for a client application for providing techniques for distributed computing and storage in accordance with the subject matter herein.

For example, shown in the GUI in FIG. 3, the end user may set or specify whether the background process can start or run when the user node device 102 is in use or not 306, when the user node device 102 is running on battery power or not 308, when the user node device 102 is connected to a cellular network or not 308, and/or the like. In some embodiments, the distribution management module 110 may have default settings such as starting the background process when the user node device 102 is connected to a constant (shore) power source, connected to a Wi-Fi or wired network, and when the user node device 102 is not in use. In certain embodiments, if one or more of the conditions changes or is otherwise not satisfied, then the distribution management module 110 shuts the background process down.

In further embodiments, the distribution management module 110 may set limits on how much of a user node device's resources can be used to perform different computing tasks, such as processing tasks or storage tasks, based on user input. For example, as shown in FIG. 3, the distribution management module 110 may provide a graphical user interface that includes interactive graphical elements where the end user can set or specify different parameters such as how much disk space can be used for storage tasks 304, how much memory can be used for processing tasks (not shown), how much processing can be used for computing tasks 302, and/or the like. In further embodiments, a user may manually start and stop the background process, e.g., to run computing tasks when one or more of the configured conditions are not met and override the configured settings.

In one embodiment, the user node devices 102 may have different characteristics or specifications, such as different software or hardware components, which may be sensitive to different conditions. Accordingly, the distribution management module 110 provides various safeguards to limit the impact of performing different tasks on the device's useful life.

For instance, many mobile devices have rechargeable batteries, which may be sensitive to temperature and charge cycles. To ensure the compute and storage tasks that the distribution management module 110 manages does not impact battery life, the distribution management module 110 may prevent tasks to be performed when the device is running on battery power and to run when the mobile device is connected to a consistent power source. In this manner, unnecessary charge cycles are not unnecessarily generated, depleting the useful life of the battery.

In another example embodiment, the distribution management module 110 monitors the temperature of the user node device 102 and can reduce or throttle down compute processing if the temperature exceeds a predefined threshold or level, e.g., a temperature level that is deemed to be potentially harmful to the battery or other component parts in the user node device 102.

Furthermore, user node devices 102 may include solid state disk ("SSD") drives, or permanent/non-volatile storage media that uses storage cells to store data in a persistent manner. Many such devices are sensitive to the number of read-write-erase cycles that occur on a specific storage cell or disk sector. To limit read-write-erase cycles, the distribution management module 110 is configured to access the disk when necessary.

For instance, when data is written to a data block of an SSD of a user node device 102, the distribution management module 110 leaves the data in the data block, even if it is deleted, skipping the erase cycle for the SSD (e.g., marking the data for deletion). The data may then be overwritten at that data block when data is written to the SSD.

In another instance, when data is read from a data block of an SSD of a user node device 102, the distribution management module 110 caches the read data upstream at the interconnect 104 for a period of time to limit disk reads on user node devices 102. If a request to read that data is received again, the distribution management module 110 at the interconnect 104 first checks the cache and responds with cached data, if present, before accessing the user node device 102 to read that block, which reduces the number of read operations on the SSD.

In another example embodiment, user node devices 102 may be connected to the Internet via a cellular network such as a 3G, 4G, or 5G cellular data network, which may be expensive (depending on the location, company, or the like). To ensure that costly cellular data is not unnecessarily used, the distribution management module 110 may not to wake the background process to perform compute tasks unless the device is connected to the Internet via a different connection such as Wi-Fi, Ethernet, or some other form of low-cost connectivity. In this manner, the distribution management module 110 reduces cellular data usage. In certain embodiments, a user may configure whether to use a cellular connection or not for performing compute tasks.

In one embodiment, user node devices 102 may run proprietary platforms such as operating systems that provide SDKs for developing software specifically for these platforms. These proprietary SDKs may provide broad access to prebuilt libraries for performing various functions. However, in many cases, the prebuild libraries do not provide functionality to take full advantage of hardware capacity and hardware acceleration on the user node devices 102. For example, a mobile phone may include a GPU that could potentially be used to perform processing or other tasks; however the full functionality of the GPU may not be available to the distribution management module 110 because the proprietary platform may not expose, e.g., via API, a way to access the full functionality of that GPU directly. Another example is a mobile phone that executes an application in a runtime environment that limits the application's access to memory and processing.

To take full advantage of the hardware capabilities of the user node device 102, the distribution management module 110 is configured to integrate with native libraries on the user node device 102 that provide broader access to the underlying hardware capabilities of the user node device 102. In one embodiment, where a native library does not exist, the distribution management module 110 uses third party libraries, or uses prebuilt and bundled native libraries written in native programming languages such as C or assembly to gain access to the underlying hardware capabilities of the user node device 102. For example, on a mobile phone, the distribution management module 110 integrates with a native C library, such as FFMpeg for transcoding video, which is designed to make use of the GPU on the mobile phone and provide hardware acceleration for video codecs rather than transcoding in software. This is one example of gaining access to the hardware capabilities of the GPU, which may otherwise be inaccessible.

In certain embodiments, the distribution management module 110 may include a hardware device such as a secure hardware dongle or other hardware appliance device (e.g., a set-top box, a network appliance, or the like) that attaches to a device such as a head mounted display, a laptop computer, a server, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the distribution management module 110 may include a power interface, a wired and/or wireless network interface, a graphical interface that attaches to a display, and/or a semiconductor integrated circuit device as described below, configured to perform the functions described herein with regard to the distribution management module 110.

The distribution management module 110, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the distribution management module 110 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the distribution management module 110.

The semiconductor integrated circuit device or other hardware appliance of the distribution management module 110, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the distribution management module 110 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

Figure 4:
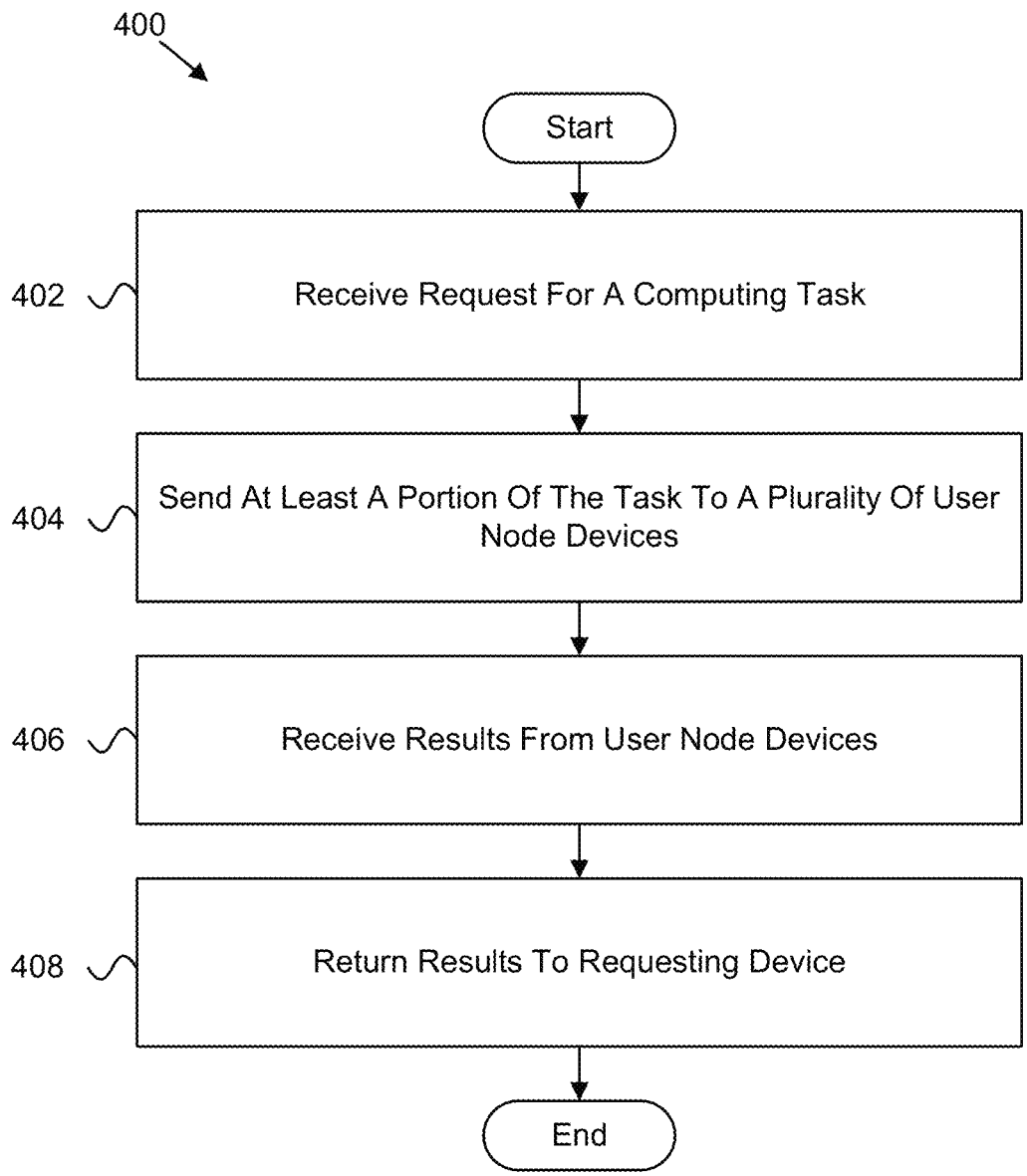
FIG. 4 illustrates one embodiment of a method for providing techniques for distributed computing and storage in accordance with the subject matter herein.

FIG. 4 illustrates one embodiment of a method 400 for providing techniques for distributed computing and storage. In one embodiment, the method 400 is performed by a user node device 102, an interconnect 104, a user client device 108, a distribution management module 110, and/or the like.

In one embodiment, the method 400 begins and receives 402 a request for a computing task from a user client device 108. The method 400, in one embodiment, sends 404 at least a portion of the task to a plurality of user node devices 102. In one embodiment, the method 400 receives 406 results of the task from the user node devices 102. In one embodiment, the method 400 returns 408 the results to the requesting user client device 108, and the method 400 ends.

Figure 5:
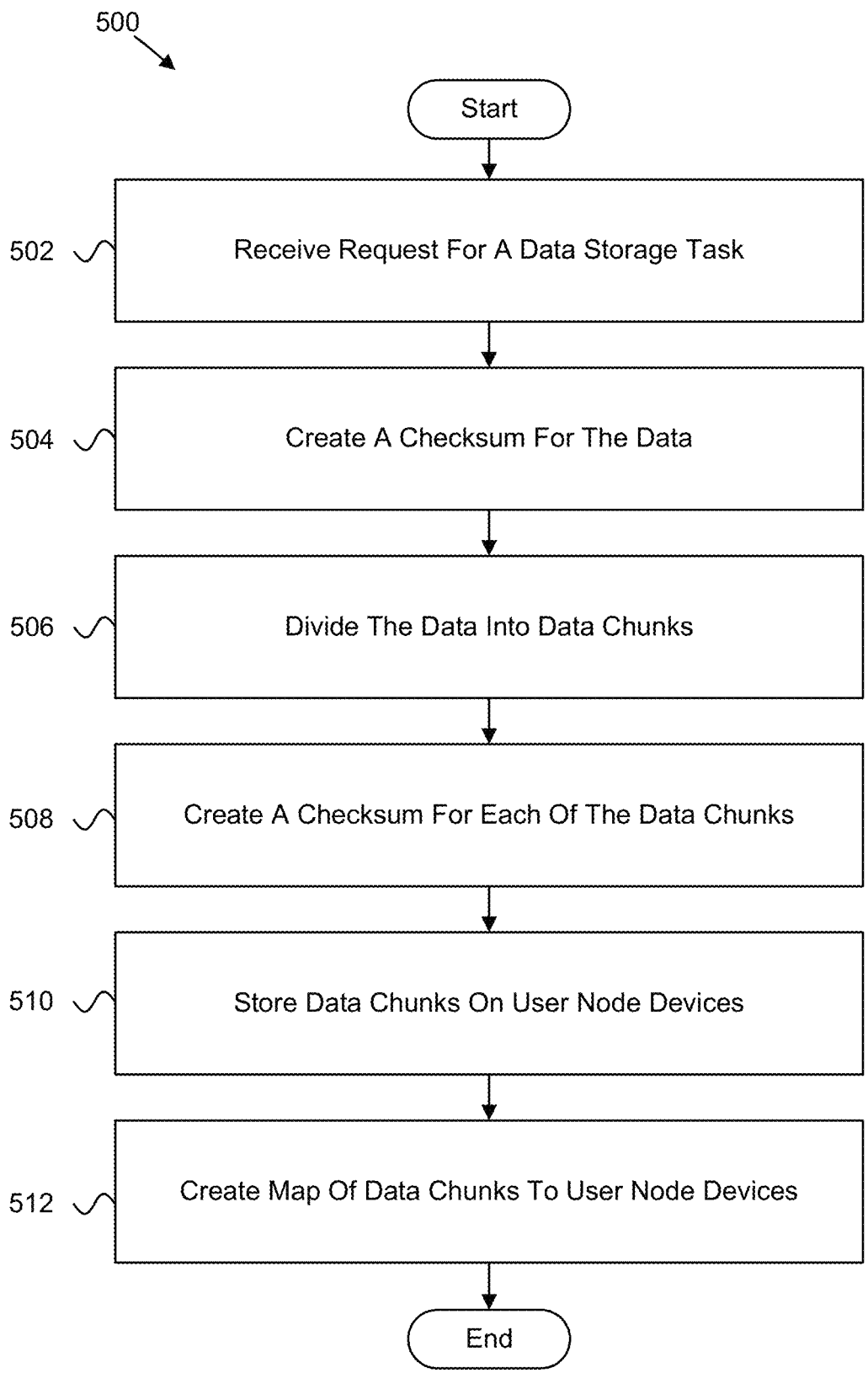
FIG. 5 illustrates one embodiment of a method for providing techniques for distributed computing and storage in accordance with the subject matter herein.

FIG. 5 illustrates one embodiment of a method 500 for providing techniques for distributed computing and storage. In one embodiment, the method 500 is performed by a user node device 102, an interconnect 104, a user client device 108, a distribution management module 110, and/or the like.

In one embodiment, the method 500 begins and receives 502 a request for a data storage task. In one embodiment, the method 500 creates 504 a checksum for the data, divides 506 the data into a plurality of data chunks, creates 508 a checksum for each of the plurality of data chunks, stores 510 each of the plurality of data chunks on at least one of the plurality of user node devices, and creates 512 a map of each of the plurality of data chunks to its corresponding checksum and the user node device where the data chunk is stored, and the method 500 ends.

Figure 6:
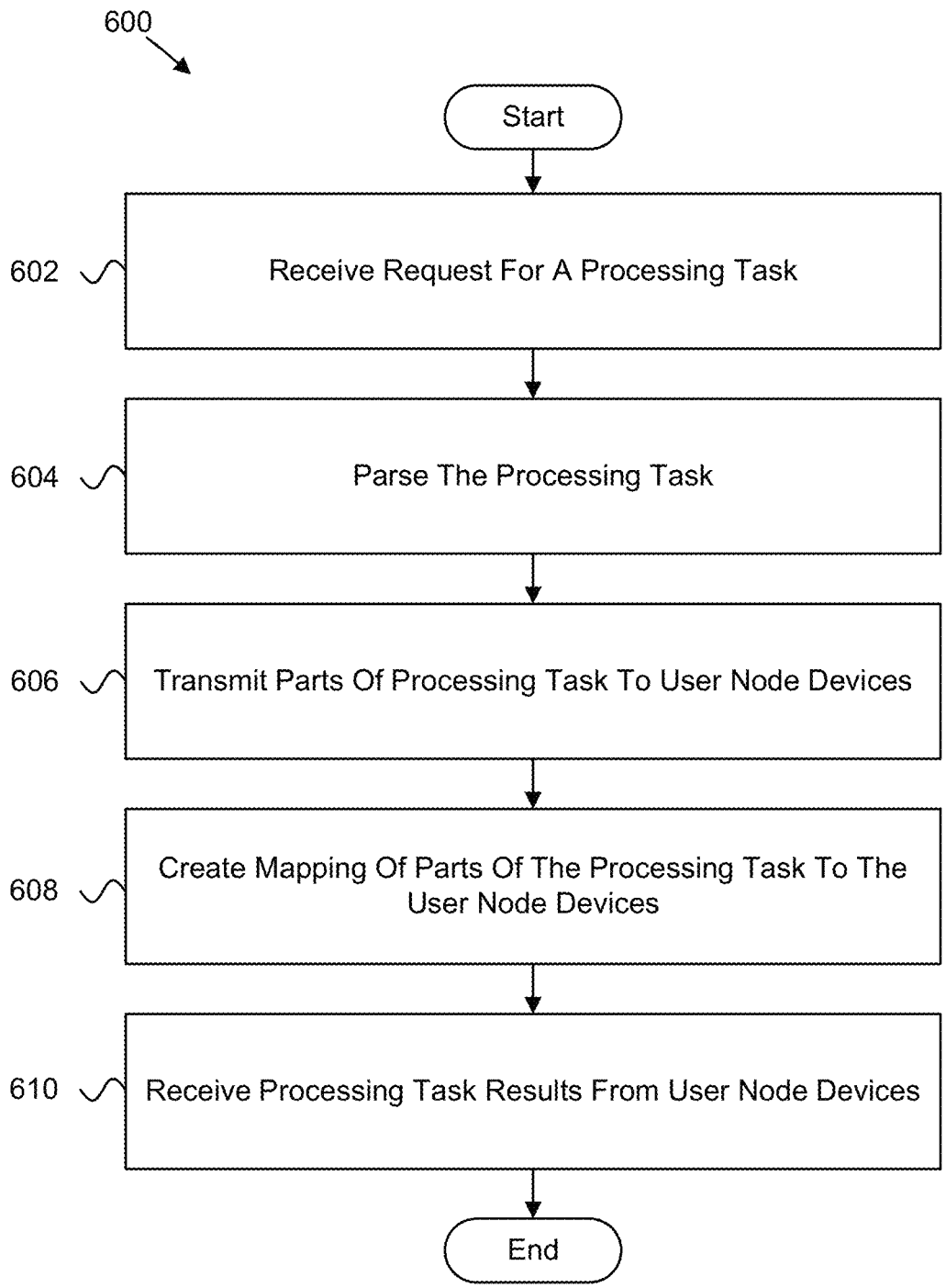
FIG. 6 illustrates one embodiment of a method for providing techniques for distributed computing and storage in accordance with the subject matter herein.

FIG. 6 illustrates one embodiment of a method 600 for providing techniques for distributed computing and storage. In one embodiment, the method 600 is performed by a user node device 102, an interconnect 104, a user client device 108, a distribution management module 110, and/or the like.

In one embodiment, the method 600 begins and receives 602 a request for a processing task. In one embodiment, the method 600 parses 604 the processing task to determine at least one capability that is needed to perform the processing task. In one embodiment, the method 600 transmits 606 different parts of the processing task to user node devices that comprise the at least one capability for performing the processing task. In one embodiment, the method 600 creates 608 a mapping of the different parts of the processing task to the user node devices performing the different parts of the processing task. In one embodiment, the method 600 receives 610 results of the different parts of the processing task, and the method 600 ends.

In one embodiment, an apparatus includes a processor and a memory that stores code that is executable by the processor to receive a request to perform a processing task, transmit at least a portion of the processing task to a plurality of user node devices, receive results of the at least a portion of the processing task from at least one of the plurality of user node devices, and transmit the received results.

In one embodiment, the code is executable by the processor to determine resources needed to perform the processing task and select the plurality of user node devices to perform the processing task in response to determining that the plurality of user node devices comprise the resources for performing the processing task.

In one embodiment, the code is executable by the processor to parse the processing task to determine at least one capability that is needed to perform the processing task, the at least one capability comprising a software function, a hardware component, or a combination thereof.

In one embodiment, the code is executable by the processor to transmit different parts of the processing task to user node devices that comprise the at least one capability for performing the processing task.

In one embodiment, the code is executable by the processor to determine capabilities of the plurality of user node devices and create a list of the determined capabilities, the list used to match a part of the processing task to a user node device that is capable of performing the part of the processing task.

In one embodiment, the code is executable by the processor to create a mapping of the different parts of the processing task to the user node devices performing the different parts of the processing task.

In one embodiment, the code is executable by the processor to receive results of the different parts of the processing task out of order and reassemble the received results in order prior to transmitting the received results.

In one embodiment, the code is executable by the processor to transmit multiple copies of the different parts of the processing task to different user node devices and receive multiple results, the first of the received multiple results being used while discarding the rest of the received multiple results.

In one embodiment, the code is executable by the processor to resend the at least one part of the processing task to another user node device in response to determining that a result associated with the at least one part of the processing task is not received or in response to determining that the user node device performing the processing task is unavailable.

In one embodiment, the code is executable by the processor to employ additional or fewer user node devices as part of a distributed system based on a number of processing task requests. In one embodiment, a minimum number of user node devices needed to perform the processing task is three.

In one embodiment, the code is executable by the processor to set limits on an amount of resources of a user node device that can be used to perform the at least a portion of the processing task. In one embodiment, the limits on the amount of resources of the user node device that can be used to perform the at least a portion of the processing task are set by the user of the user node device.

In one embodiment, a system includes an interconnect node, a plurality of user node devices communicatively coupled to the interconnect node, and an apparatus that is configured to receive, at the interconnect node, a request to perform a processing task, transmit, from the interconnect node, at least a portion of the processing task to the plurality of user node devices, receive, at the interconnect node, results of the at least a portion of the processing task from at least one of the plurality of user node devices, and transmit, from the interconnect node, the received results.

In one embodiment, the plurality of user node devices comprise end user mobile devices. In one embodiment, the request to perform a processing task is received from a user client device.

In one embodiment, the user client device is communicatively coupled to the interconnect, the interconnect comprising one of a plurality of interconnects that is optimal for the user client device. In one embodiment, the system includes at least two input/output (I/O) network channels connected the interconnect node to each of the plurality of user node devices, a first I/O network channel used for sending and receiving data and a second I/O network channel used for command and control of the I/O network channels.

In one embodiment, the apparatus is configured to determine resources needed to perform the processing task and select the plurality of user node devices to perform the processing task in response to determining that the plurality of user node devices comprise the resources for performing the processing task.

In one embodiment, the apparatus is configured to parse the processing task to determine at least one capability that is needed to perform the processing task, the at least one capability comprising a software function, a hardware component, or a combination thereof.

In one embodiment, the apparatus is configured to transmit different parts of the processing task to user node devices that comprise the at least one capability for performing the processing task.

In one embodiment, the apparatus is configured to determine capabilities of the plurality of user node devices and create a list of the determined capabilities, the list used to match a part of the processing task to a user node device that is capable of performing the part of the processing task.

In one embodiment, the apparatus is configured to create a mapping of the different parts of the processing task to the user node devices performing the different parts of the processing task.

In one embodiment, the apparatus is configured to receive results of the different parts of the processing task out of order and reassemble the received results in order prior to transmitting the received results.

In one embodiment, the apparatus is configured to transmit multiple copies of the different parts of the processing task to different user node devices and receive multiple results, the first of the received multiple results being used while discarding the rest of the received multiple results.

In one embodiment, the apparatus is configured to resend the at least one part of the processing task to another user node device in response to determining that a result associated with the at least one part of the processing task is not received or in response to determining that the user node device performing the processing task is unavailable.

In one embodiment, the apparatus is configured to employ additional or fewer user node devices as part of a distributed system based on a number of processing task requests. In one embodiment, a minimum number of user node devices needed to perform the processing task is three.

In one embodiment, the apparatus is configured to set limits on an amount of resources of a user node device that can be used to perform the at least a portion of the processing task. In one embodiment, the limits on the amount of resources of the user node device that can be used to perform the at least a portion of the computing task are set by the user of the user node device.

In one embodiment, a method includes receiving a request to perform a processing task, transmitting at least a portion of the processing task to a plurality of user node devices, receiving results of the at least a portion of the processing task from at least one of the plurality of user node devices, and transmitting the received results.

In one embodiment, the method determines resources needed to perform the processing task and selects the plurality of user node devices to perform the processing task in response to determining that the plurality of user node devices comprise the resources for performing the processing task.

In one embodiment, the method parses the processing task to determine at least one capability that is needed to perform the processing task, the at least one capability comprising a software function, a hardware component, or a combination thereof.

In one embodiment, the method transmits different parts of the processing task to user node devices that comprise the at least one capability for performing the processing task.

In one embodiment, the method determines capabilities of the plurality of user node devices and create a list of the determined capabilities, the list used to match a part of the processing task to a user node device that is capable of performing the part of the processing task.

In one embodiment, the method creates a mapping of the different parts of the processing task to the user node devices performing the different parts of the processing task.

In one embodiment, the method receives results of the different parts of the processing task out of order and reassemble the received results in order prior to transmitting the received results.

In one embodiment, the method transmits multiple copies of the different parts of the processing task to different user node devices and receive multiple results, the first of the received multiple results being used while discarding the rest of the received multiple results.

In one embodiment, the method resends the at least one part of the processing task to another user node device in response to determining that a result associated with the at least one part of the processing task is not received or in response to determining that the user node device performing the processing task is unavailable.

In one embodiment, the method employs additional or fewer user node devices as part of a distributed system based on a number of processing task requests. In one embodiment, a minimum number of user node devices needed to perform the processing task is three.

In one embodiment, the method sets limits on an amount of resources of a user node device that can be used to perform the at least a portion of the processing task. In one embodiment, the limits on the amount of resources of the user node device that can be used to perform the at least a portion of the computing task are set by the user of the user node device.

A means for receiving a request to perform a processing task, in various embodiments, may include one or more of a user node device 102, an interconnect device 104, a distribution management module 110, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application, and/or other executable code stored on a computer readable storage medium. Other embodiments may include similar or equivalent means for receiving a request to perform a processing task.

A means for transmitting at least a portion of the processing task to a plurality of user node devices 102, in various embodiments, may include one or more of a user node device 102, an interconnect device 104, a distribution management module 110, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application, and/or other executable code stored on a computer readable storage medium. Other embodiments may include similar or equivalent means for transmitting at least a portion of the processing task to a plurality of user node devices 102.

A means for receiving results of the at least a portion of the processing task from at least one of the plurality of user node devices 102, in various embodiments, may include one or more of a user node device 102, an interconnect device 104, a distribution management module 110, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application, and/or other executable code stored on a computer readable storage medium. Other embodiments may include similar or equivalent means for receiving results of the at least a portion of the processing task from at least one of the plurality of user node devices 102.

A means for transmitting the received results, in various embodiments, may include one or more of a user node device 102, an interconnect device 104, a distribution management module 110, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application, and/or other executable code stored on a computer readable storage medium. Other embodiments may include similar or equivalent means for transmitting the received results.

A means for performing other functions, tasks, jobs, instructions, or the like described herein may include, an interconnect device 104, a distribution management module 110, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a hardware appliance or other hardware computing device, other logic hardware, an application, and/or other executable code stored on a computer readable storage medium.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

What is claimed is:

1. An apparatus, comprising:
a processor; and
a memory that stores code executable by the processor to:
receive a request to perform a processing task;
transmit at least a portion of the processing task to a plurality of user node devices;
create a mapping of the at least a portion of the processing task to the plurality of user node devices performing the at least a portion of the processing task;
receive results of the at least a portion of the processing task from at least a subset of the plurality of user node devices based on the mapping; and
transmit the received results.

2. The apparatus of claim 1, wherein the code is executable by the processor to:
determine resources needed to perform the processing task; and
select the plurality of user node devices to perform the processing task in response to determining that the plurality of user node devices comprise the resources for performing the processing task.

3. The apparatus of claim 1, wherein the code is executable by the processor to parse the processing task to determine at least one capability that is needed to perform the processing task, the at least one capability comprising a software function, a hardware component, or a combination thereof.

4. The apparatus of claim 3, wherein the code is executable by the processor to transmit different parts of the processing task to user node devices that comprise the at least one capability for performing the processing task.

5. The apparatus of claim 4, wherein the code is executable by the processor to determine capabilities of the plurality of user node devices and create a list of the determined capabilities, the list used to match a part of the processing task to a user node device that is capable of performing the part of the processing task.

6. The apparatus of claim 4, wherein the code is executable by the processor to receive results of the different parts of the processing task out of order and reassemble the received results in order prior to transmitting the received results.

7. The apparatus of claim 4, wherein the code is executable by the processor to transmit multiple copies of the different parts of the processing task to different user node devices and receive multiple results, a first of the received multiple results being used while discarding the rest of the received multiple results.

8. The apparatus of claim 4, wherein the code is executable by the processor to resend at least one part of the processing task to another user node device in response to determining that a result associated with the at least one part of the processing task is not received or in response to determining that the user node device performing the processing task is unavailable.

9. The apparatus of claim 1, wherein the code is executable by the processor to employ additional or fewer user node devices as part of a distributed system based on a number of processing task requests.

10. The apparatus of claim 9, wherein a minimum number of user node devices needed to perform the processing task is three.

11. The apparatus of claim 1, wherein the code is executable by the processor to set limits on an amount of resources of a user node device that can be used to perform the at least a portion of the processing task.

12. The apparatus of claim 11, wherein the limits on the amount of resources of the user node device that can be used to perform the at least a portion of the processing task are set by the user of the user node device.

13. A system, comprising:
a plurality of user node devices; and an interconnect node communicatively coupled to the plurality of user node devices, comprising:
a processor; and
a memory that stores code executable by the processor to:
receive a request to perform a processing task;
transmit at least a portion of the processing task to the plurality of user node devices;
create a mapping of the at least a portion of the processing task to the plurality of user node devices performing the at least a portion of the processing task;
receive receive results of the at least a portion of the processing task from at least a subset of the plurality of user node devices based on the mapping; and
transmit the received results.

14. The system of claim 13, wherein the plurality of user node devices comprise end user mobile devices.

15. The system of claim 13, wherein the request to perform a processing task is received from a user client device.

16. The system of claim 15, wherein the user client device is communicatively coupled to the interconnect, the interconnect comprising one of a plurality of interconnects that is optimal for the user client device.

17. The system of claim 13, further comprising at least two input/output (I/O) network channels connected the interconnect node to each of the plurality of user node devices, a first I/O network channel used for sending and receiving data and a second I/O network channel used for command and control of the I/O network channels.

18. The system of claim 13, wherein the code is executable by the processor to:
determine resources needed to perform the processing task; and
select the plurality of user node devices to perform the processing task in response to determining that the plurality of user node devices comprise the resources for performing the processing task.

19. The system of claim 13, wherein the code is executable by the processor to parse the processing task to determine at least one capability that is needed to perform the processing task, the at least one capability comprising a software function, a hardware component, or a combination thereof.

20. The system of claim 19, wherein the code is executable by the processor to transmit different parts of the processing task to user node devices that comprise the at least one capability for performing the processing task.

21. The system of claim 20, wherein the code is executable by the processor to determine capabilities of the plurality of user node devices and create a list of the determined capabilities, the list used to match a part of the processing task to a user node device that is capable of performing the part of the processing task.

22. The system of claim 20, wherein the code is executable by the processor to create a mapping of the different parts of the processing task to the user node devices performing the different parts of the processing task.

23. The system of claim 20, wherein the code is executable by the processor to receive results of the different parts of the processing task out of order and reassemble the received results in order prior to transmitting the received results.

24. The system of claim 20, wherein the code is executable by the processor to transmit multiple copies of the different parts of the processing task to different user node devices and receive multiple results, the first of the received multiple results being used while discarding the rest of the received multiple results.

25. The system of claim 20, wherein the code is executable by the processor to resend the at least one part of the processing task to another user node device in response to determining that a result associated with the at least one part of the processing task is not received or in response to determining that the user node device performing the processing task is unavailable.

26. A method, comprising:
receiving a request to perform a processing task;
transmitting at least a portion of the processing task to a plurality of user node devices;
creating a mapping of the at least a portion of the processing task to the plurality of user node devices performing the at least a portion of the processing task;
receiving results of the at least a portion of the processing task from at least a subset of the plurality of user node devices based on the mapping; and
transmitting the received results.

27. The method of claim 26, further comprising:
determining resources needed to perform the processing task; and
selecting the plurality of user node devices to perform the processing task in response to determining that the plurality of user node devices comprise the resources for performing the processing task.

28. The method of claim 26, further comprising parsing the processing task to determine at least one capability that is needed to perform the processing task, the at least one capability comprising a software function, a hardware component, or a combination thereof.

29. The method of claim 28, further comprising transmitting different parts of the processing task to user node devices that comprise the at least one capability for performing the processing task.

* * * * *